(No Model.)
J. W. TOMBOW.
Nut Lock.
No. 234,350. Patented Nov. 9, 1880.
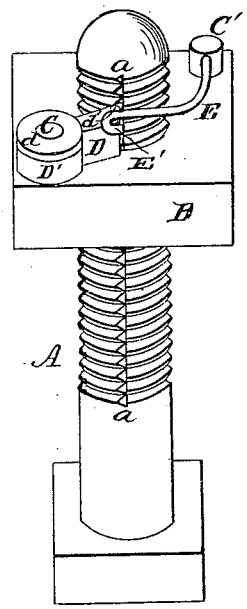
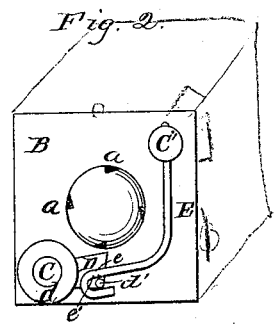
Witnesses:
H. N. Low
J. S. Barker
Inventor:
John W. Tombow
by Doubleday and Bliss
attys

UNITED STATES PATENT OFFICE.

JOHN W. TOMBOW, OF MASSILLON, OHIO.

NUT-LOCK.

SPECIFICATION forming part of Letters Patent No. 234,350, dated November 9, 1880.

Application filed July 7, 1880. (No model.)

*To all whom it may concern:*

Be it known that I, JOHN W. TOMBOW, of Massillon, in the county of Stark and State of Ohio, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a perspective of the bolt and nut locked together by my improved lock, and Fig. 2 is an end view of the parts when disengaged.

In the drawings, A represents the shank of the bolt. $a\ a$ are grooves cut through the threads on lines substantially parallel with its axis.

B is a nut, which, in general construction, is similar to ordinary nuts. C C' are pins or studs cast with or secured to the nut and situated preferably on opposite sides of the bolt, as shown.

D represents a dog, pivoted to stud C by means of a collar, D', secured in position by a plate or washer, $d$. The dog D, when pressed against the bolt, engages with it by means of the grooves $a\ a$, and thus prevents the nut from backing off. $a'$ is a pin projecting from dog D near its outer end.

E represents a spring, one end of which is securely attached to pin or stud C'. This spring is bent around the bolt so that its free end can be brought to bear against the pin $d'$ on dog D.

A loop, E', is formed at the free end of the spring by bending it back, whereby two bearing-points, $e\ e'$, for the pin are formed. When the spring is so placed that it bears against the pin, the dog D is held firmly against the bolt to prevent accidental backing off of the nut; but when the spring is placed as shown in Fig. 2 the pin is held within the loop E', which prevents engagement of the dog D and permits the nut to be turned backward.

I am aware that it is old to provide a lock for a nut by attaching to the nut a two-armed catch pivoted at a point between the arms and a two-armed spring arranged so that the catch and spring entirely surround the bolt, and so that one part of the spring can bear against one arm of the catch to preserve engagement and the other part of the spring can bear against the opposite arm of the catch to prevent engagement; but the object of my invention is to provide a lock which shall effect all of these purposes, and of which the parts shall be in the simplest form possible, so that they can be cheaply made and readily replaced. I accomplish my ends by using a catch or dog with a single arm and having a pin projecting from its outer face, and combining therewith a single spring which is mounted on the outer face of the nut above the dog, and which is so arranged that one and the same end thereof shall either preserve or prevent the engagement of the dog.

What I claim is—

The combination, with the grooved bolt A, the nut B, the dog D, pivoted to the outer face of the nut, and the pin $d'$, projecting from the outer face of the dog, of the bent spring E, when supported above the dog D and arranged to have but one free end, which end bears against one side of the pin $d'$ to hold the dog in engagement with the bolt, and bears against the opposite side of said pin when the dog is held out of engagement, as set forth.

In testimony that I claim the foregoing I have hereunto set my hand.

JOHN W. TOMBOW.

Witnesses:
JACOB P. FAWCETT,
HENRY FISHER.